(12) United States Patent
Hayes et al.

(10) Patent No.: US 6,340,249 B1
(45) Date of Patent: Jan. 22, 2002

(54) CONNECTOR ASSEMBLY AND METHOD OF SECURING FIBER OPTIC CABLE TO CONNECTOR

(75) Inventors: Earl J. Hayes, South Lyon, MI (US); Thomas A. Hall, III, Hickory, NC (US); Bo M. Wang, Greer, SC (US)

(73) Assignee: Alcoa Fujikura Limited, Brentwood, TN (US)

( * ) Notice: Subject to any disclaimer, the term of this patent is extended or adjusted under 35 U.S.C. 154(b) by 0 days.

(21) Appl. No.: 09/394,739

(22) Filed: Sep. 13, 1999

(51) Int. Cl.$^7$ .................................................. G02B 6/36
(52) U.S. Cl. .............................. 385/86; 385/62; 385/78
(58) Field of Search .............................. 385/62, 76, 78, 385/77, 81

(56) References Cited

U.S. PATENT DOCUMENTS

| | | | |
|---|---|---|---|
| 4,607,911 A | 8/1986 | Rhodes | 350/96.2 |
| 4,679,895 A | 7/1987 | Huber | 350/96.2 |
| 4,687,288 A | 8/1987 | Margolin et al. | 350/96.2 |
| 4,708,428 A | 11/1987 | Loeffler et al. | 350/96.2 |
| 5,088,804 A | 2/1992 | Grinderslev | 385/81 |
| 5,113,474 A | 5/1992 | Slaney et al. | 385/136 |
| 5,121,455 A | 6/1992 | Plaecek | 385/69 |
| 5,140,661 A * | 8/1992 | Kerek | 385/81 |
| 5,208,887 A | 5/1993 | Grinderslev | 385/81 |
| 5,276,752 A | 1/1994 | Gugelmeyer et al. | 385/69 |
| 5,499,310 A | 3/1996 | Ueda | 385/84 |
| RE35,935 E * | 10/1998 | Cabato et al. | 385/87 |

* cited by examiner

*Primary Examiner*—Georgia Epps
*Assistant Examiner*—Tim Thompson
(74) *Attorney, Agent, or Firm*—Tracey D. Beiriger

(57) ABSTRACT

An apparatus and method for securing fiber optic cable to a connector, comprising providing a cable, said cable having an outer surface, an end section, a cable jacket, and a strengthening material; positioning a strain relief boot on said outer surface of said cable, said strain relief boot having an inner surface, wherein said inner surface has a first geometric pattern; providing a connector assembly, said connector assembly having a connector assembly part, a plug end, a cable end, and an exterior surface, wherein said exterior surface has a second geometric pattern which cooperates with said first geometric pattern on said inner surface of said strain relief boot, said connector part being located on said cable end; positioning said end section of said cable in a manner such that said cable jacket and said strengthening material touch, and cover said outer surface of said connector part; and using a simple tool to slide said strain relief boot toward said connector, and over said connector part, thereby exerting pressure and causing said cable jacket and said strengthening material to be captured in a hazardous path between said first geometric pattern on inner surface of said strain relief boot, and said second geometric pattern on said exterior surface of said connector assembly part.

15 Claims, 4 Drawing Sheets

DETAIL B

CONNECTOR ASSEMBLY AND METHOD OF SECURING FIBER OPTIC CABLE TO CONNECTOR

FIELD OF THE INVENTION

The present invention relates to a connector assembly and method for securing a fiber optic reinforced cable to a connector, more particularly, the connector may be secured to the cable without the use of either a crimp ring or epoxy. Rather the cable and connector are secured by pressure directly to each other, with the strengthening material and cable jacket between, in a hazardous path (alternate steps) using mating geometries of the strain relief boot and connector.

BACKGROUND OF THE INVENTION

It is well known within the fiber optic industry to use either epoxy or crimp rings to secure a reinforced cable to fiber optic connectors. Epoxy is, however, process sensitive, messy, and of questionable reliability. The use of crimp rings adds parts, cost, and a processing step to the termination process. For these reasons the use of crimp rings is problematic.

U.S. Pat. No. 4,708,428 claims a light waveguide connector, using a hollow extension to prolong the connector body. The extension has a section with external grooves that cooperate with the internal grooves of a clamping sleeve. Prior to placing the clamping sleeve over the grooved area of the extension, the grooved area of the extension is covered with an end section of KEVLAR® fiber (KEVLAR® is a registered trademark of E.I. DuPont De Nemours) located directly under the cable jacket, and not covered by the cable jacket of the cable. The light waveguide cable is secured to the connector by engaging the KEVLAR® between the cooperating grooves of the extension, and the clamping sleeve. U.S. Pat. No. 4,707,428 does not disclose engagement of the cable jacket between the cooperating grooves of the extension and the clamping sleeve.

It is the primary objective of the present invention to provide a reliable method for securing a fiber optic cable to a connector.

It is an objective of the present invention to provide a connector assembly capable of being secured onto a cable without the use of adhesive.

Another objective of the present invention is provide a method for securing a fiber optic cable to a connector without using any type of adhesive.

Another objective of the present invention is to avoid the process sensitivity encountered with the use of adhesives, such as epoxy.

Another objective of the present invention is to avoid the messy results that accompany the use of adhesive, such as epoxy.

Another objective of the present invention is to avoid the unpredictable results often encountered with the use of adhesives, such as epoxy.

Another objective of the present invention is to avoid the use of crimping.

Another objective the present invention is to avoid the extra mechanical pails associated with crimping.

Another objective of the present invention is to avoid the excess costs associated with crimping.

Yet another objective of the present invention is to eliminate the additional process step associated with crimping.

The present invention, in contrast to U.S. Pat. No. 4,708,428, provides a connector assembly and method for attaching a fiber optic cable to the connector of the connector assembly by securing the connector and a strain relief boot directly to one another with pressure. This causes the capturing of both the KEVLAR® and the cable jacket between a hazardous path created by the mating geometries of the strain relief boot and the connector.

Additional objectives, and advantages of the present invention will become apparent to persons skilled in the art from the following detailed description.

SUMMARY OF THE INVENTION

According to the present invention, the need for either a crimp ring, or epoxy is eliminated for securing a connector to the cable. This reduction in parts or materials reduces both the pail and process costs. Additionally, elimination of epoxy use makes the process more efficient, neater, and more reliable. The invention involves securing the fiber optic cable, reinforced with KEVLAR®, onto the connector directly through the use of pressure and a hazardous path. The hazardous path results from cooperating geometries designed into the strain relief boot and the connector pall which is the stop ring in an SC connector, frame A in an FC connector, and ferrule stem in an ST connector. Both the KEVLAR® and the cable jacket are captured between the strain relief boot and the geometrically cooperating connector part. The pressure exerted by the elastomer strain relief boot forces both the cable jacket and the KEVLAR® to follow the hazardous path geometry between the parts. When an axial load is applied to the cable, the friction created by the interference points along the hazardous path sufficiently constrains the cable jacket, the KEVLAR®, and consequently, the cable from separating from the connector. A simple tool is used to push the strain relief boot onto the mating connector part. The present invention provides a connector and method for securing a cable to the connector, rendering the use of a crimp ring and epoxy unnecessary. The elimination of the crimp ring from the process results in a reduction in the number of parts needed and process costs. The elimination of epoxy results in a neater, more efficient, and more reliable process.

DETAILED DESCRIPTION OF PREFERRED EMBODIMENTS

Figure 1:
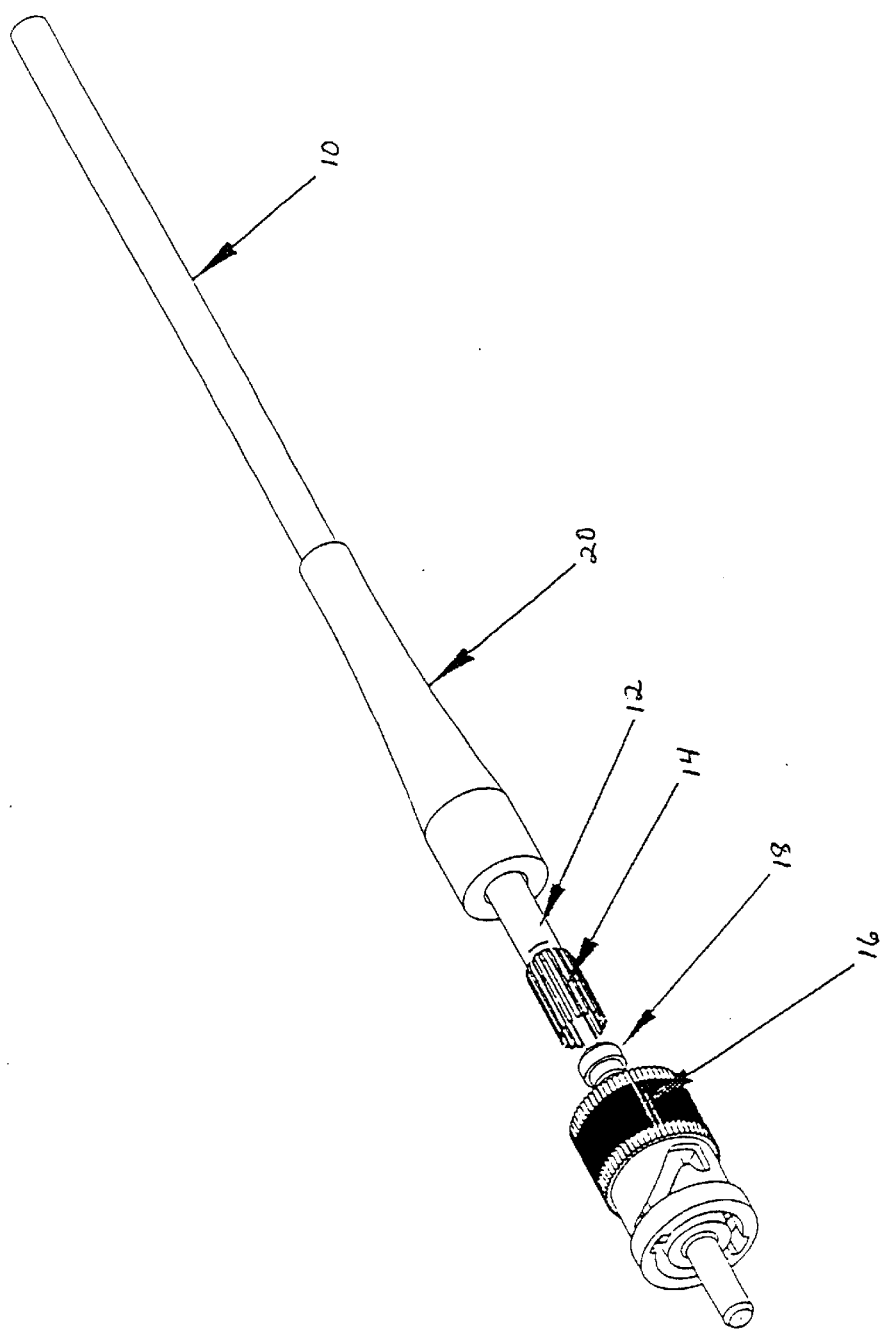
FIG. 1 shows an SC fiber optic connector having a stop ring with an outer surface designed to correspond to the inner surface of a strain relief boot.

FIG. 1 shows the connector employed in the method of securing a fiber optic cable to an SC fiber optic connector without using either a crimp ring, or epoxy. A fiber optic cable (10), having a cable jacket (12), and a strengthening material (14), is supplied. A fiber optic connector assembly (16), with a stop ring (18), having an outer geometry (19), is also supplied. A slideable strain relief boot (20), having an inner geometry (21) that cooperates with the outer geometry (19) of the stop ring (18) is placed on the outside of the fiber optic cable (10).

Figure 2:
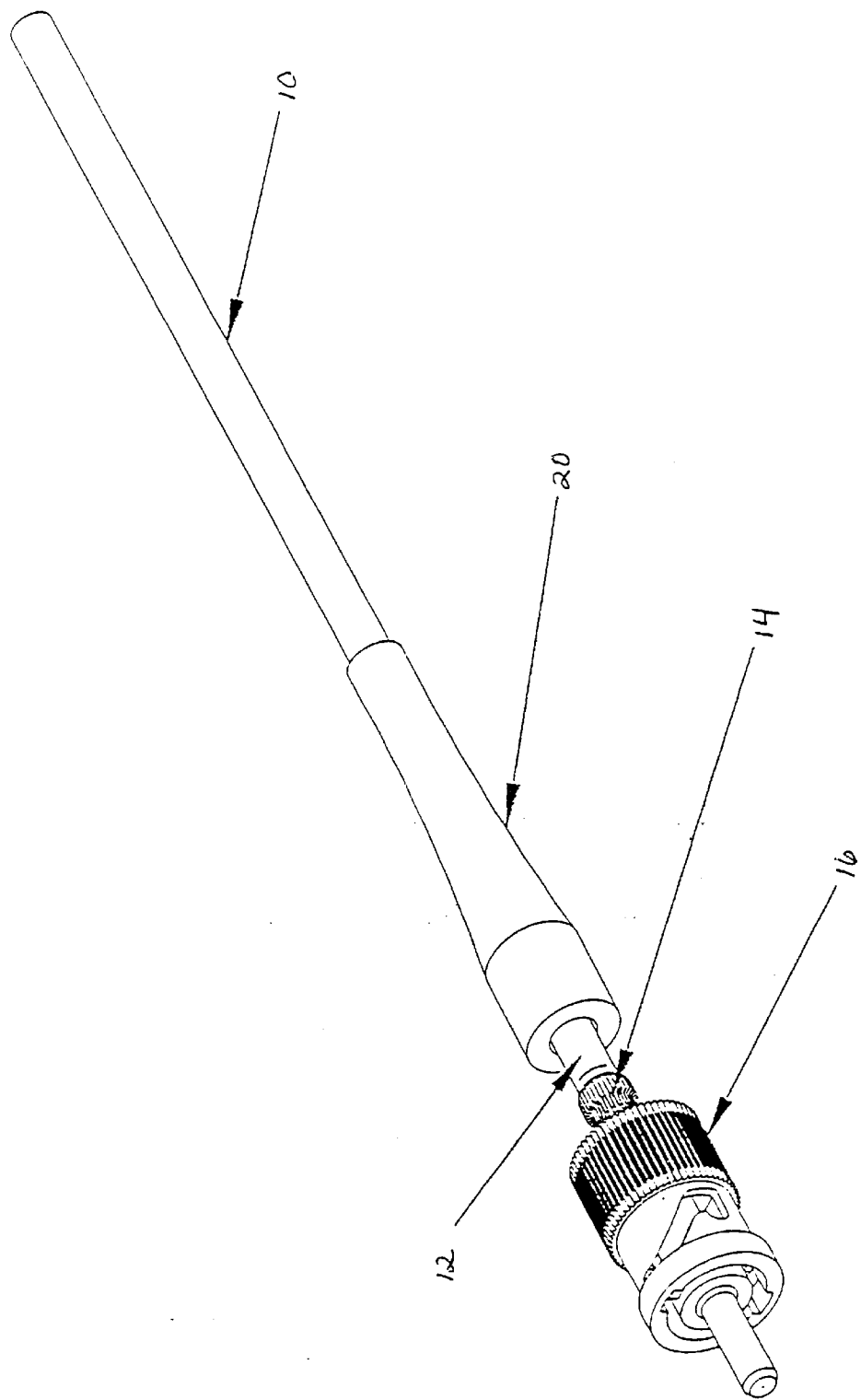
FIG. 2 shows the strengthening material of a cable positioned on the outer surface of the stop ring of the connector of FIG. 1.

As seen in FIG. 2, the strengthening material (14) of cable (10) is placed into position over the external geometry (19) of the stop ring (18) of the connector assembly (16). Additionally, the cable jacket (12) is positioned on the exterior portion of the strengthening material (14), and over the stop ring (18). The foregoing results in the strengthening material (14), as well as the cable jacket (12) conforming to the external geometry of the stop ring (18). The strengthening material (14) and the cable jacket (12) are thus in position to be engaged by the strain relief boot (20).

Figure 3:
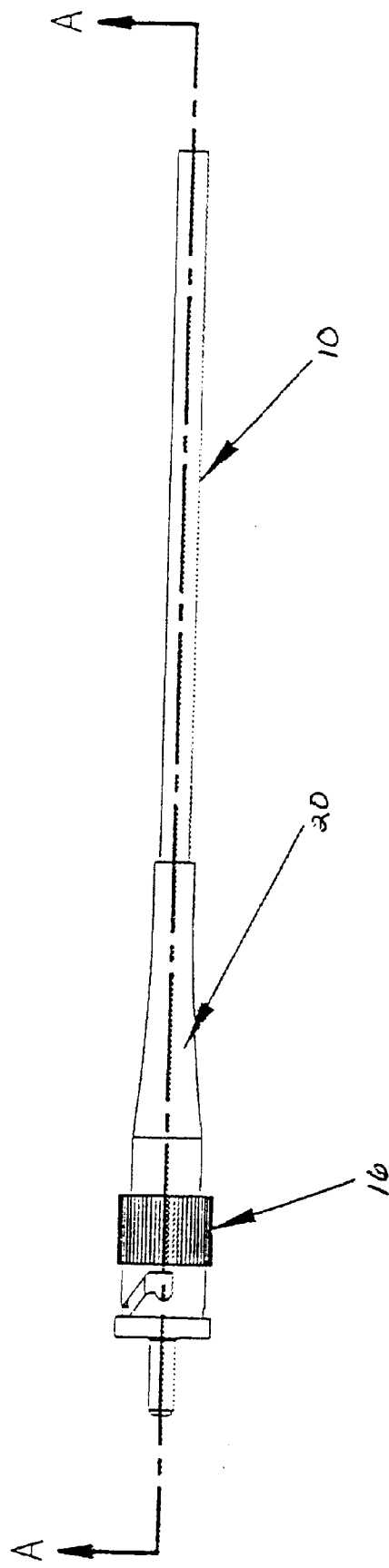
FIG. 3 shows the connector assembly having the strength relief boot mated with the stop ring of the connector of FIG. 1.
Figure 4:
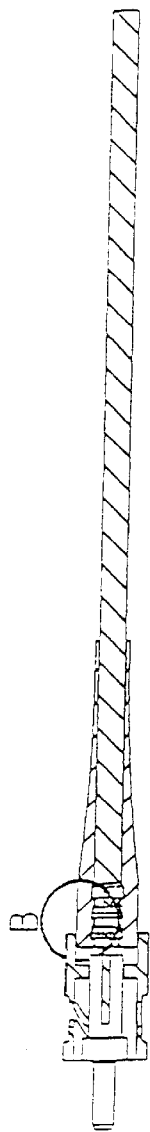
FIG. 4 shows the cross section of the connector assembly of FIG. 3.
Figure 5:
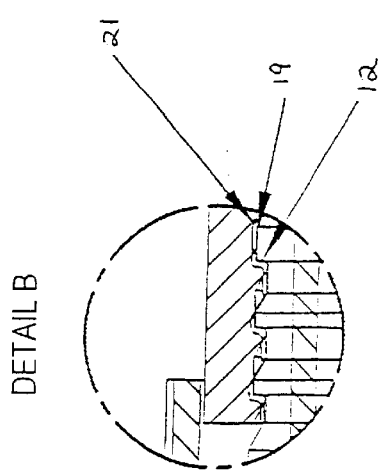
FIG. 5 shows a detailed view of the cable jacket and Kevlar held between the strain relief boot and the stop ring.

As indicated in FIGS. 3 and 4, using a simple tool, the strain relief boot (20) is placed over the cable jacket (12) and the strengthening material (14). The inner geometry (21) of the strain relief boot (20) corresponds with external geometry (19) of the stop ring (18). As a result, the strengthening material (14) and the cable jacket (12) are captured in a hazardous path between the cooperating geometries of the strain relief boot (20) and the stop ring (18), and held in place by the pressure exerted between the stain relief boot (20) and the stop ring (18). When an axial load is applied to the fiber optic cable (10), the friction created by the interference points along the hazardous path sufficiently constrains the fiber optic cable jacket (12) and the strengthening material (14) from separating from the stop ring (18), thus keeping the fiber optic cable (10) secured to the fiber optic connector assembly (16). This secured connection is illustrated in FIG. 5.

It is to be appreciated that the claimed apparatus and method successfully accomplishes the same secured connection between a fiber optic cable and other fiber optic connector assemblies. For example, with an FC connector, the internal geometry of the strain relief boot cooperates with the external geometry of the frame A connector part. Additionally, the internal geometry of the strain relief boot also cooperates with the external geometry of the ferrule stem connector part in an ST connector. Although the invention has been described with respect to specific connector assemblies, the attached claims are not to be thus limited, but rather are to be construed as embodying all modifications and alternative constructions that may occur to one skilled in the art which fairly fall within the basic teaching set forth here.

Having described the presently preferred embodiments, it is to be understood that the invention may be otherwise embodied within the scope of the appended claims.

What is claimed is:

1. A fiber optic connector assembly for connecting a fiber optic connector and a fiber optic cable, said cable having a cable jacket and a strengthening material, said connector assembly comprising:

a connector assembly body having an exterior surface with a geometric pattern; and a strain relief boot having an inner surface geometrically designed to mate with said geometric pattern of said exterior surface of said connector assembly body such that when said cable is positioned so that said cable jacket and strengthening material touch and cover said exterior surface of said connector assembly body and said strain relief boot is slid over said connector assembly body, said cable jacket and said strengthening material are captured in a hazardous path formed between said mating inner surface of said strain relief boot and said exterior surface of said connector assembly body.

2. The connector assembly according to claim 1 wherein said fiber optic connector is an SC connector.

3. The connector assembly according to claim 2 wherein said connector assembly body is a stop ring.

4. The connector assembly according to claim 1 wherein said fiber optic connector is an FC connector.

5. The connector assembly according to claim 4 wherein said connector assembly body is a frame A.

6. The connector assembly according to claim 1 wherein said fiber optic connector is an ST connector.

7. The connector assembly according to claim 6 wherein said connector assembly body is a ferrule stem.

8. A method for securing fiber optic cable to a connector, comprising:

providing a cable, said cable having an outer surface, an end section, a cable jacket, and a strengthening material;

positioning a strain relief boot about said outer surface of said cable, said strain relief boot having an inner surface, wherein said inner surface has a first geometric patter;

providing a connector assembly, said connector assembly having a connector assembly part, a plug end, a cable end, and an exterior surface, wherein said exterior surface has a second geometric pattern which cooperates with said first geometric pattern on said inner surface of said strain relief boot, said connector part being located on said cable end;

positioning said end section of said cable in a manner such that said cable jacket and said strengthening material touch, and cover said outer surface of said connector part; and using a simple tool to slide said strain relief boot toward said connector, and over said connector part thereby exerting pressure and causing said cable jacket and said strengthening material to be captured in a hazardous path between said first geometric pattern on inner surface of said strain relief boot, and said second geometric pattern on said exterior surface of said connector assembly part.

9. The method according to claim 8, said connector being an SC connector.

10. The method according to claim 9, said connector assembly part being a stop ring.

11. The method according to claim 8, said connector assembly being an FC connector.

12. The method according to claim 11, said connector assembly part being a frame A.

13. The method according to claim 8, said connector assembly being an ST connector.

14. The method according to claim 13, said connector assembly part being a ferrule stem.

15. A fiber optic connector assembly for connecting a fiber optic connector and a fiber optic cable, said cable having a cable jacket and a strengthening material, said connector assembly comprising:

a connector assembly body having an exterior surface with a geometric pattern; and a strain relief boot having an inner surface geometrically designed to mate with said geometric pattern of said exterior surface of said connector assembly body such that when said cable is positioned so that said cable jacket and strengthening material touch and cover said exterior surface of said connector assembly body and said strain relief boot is slid over said connector assembly body, said cable jacket and said strengthening material are captured in a hazardous path formed between said mating inner surface of said strain relief boot and said exterior surface of said connector assembly body.

* * * * *